US005712486A

United States Patent [19]
Soltani et al.

[11] Patent Number: 5,712,486
[45] Date of Patent: Jan. 27, 1998

[54] FLEXIBLE CASSETTE FOR HOLDING STORAGE PHOSPHOR SCREEN

[75] Inventors: Peter K. Soltani, West Chester; Michael D. Neary, Phoenixville, both of Pa.; Ronald Jay Geil, Sr., Vermilion, Ohio

[73] Assignee: Liberty Technologies, Inc., Conshohocken, Pa.

[21] Appl. No.: 633,917

[22] Filed: Apr. 15, 1996

[51] Int. Cl.⁶ .......................... B65D 85/00; G03B 42/04
[52] U.S. Cl. ................................ 250/484.4; 378/184
[58] Field of Search ............................ 378/168, 169, 378/182, 184, 185; 250/483.1, 484.2, 484.4

[56] References Cited

U.S. PATENT DOCUMENTS

| | | |
|---|---|---|
| 3,971,470 | 7/1976 | White ............................ 378/182 X |
| 4,108,308 | 8/1978 | Franke et al. ............................ 378/169 |
| 4,506,788 | 3/1985 | Dallas ............................ 378/184 X |
| 4,802,618 | 2/1989 | Seto et al. ............................ 250/484.4 X |
| 5,065,866 | 11/1991 | Boutet et al. . |
| 5,090,567 | 2/1992 | Boutet . |
| 5,138,160 | 8/1992 | Shimizu et al. . |
| 5,276,333 | 1/1994 | Robertson . |
| 5,310,059 | 5/1994 | Robertson . |
| 5,324,957 | 6/1994 | Hejazi . |
| 5,326,983 | 7/1994 | Hejazi . |

FOREIGN PATENT DOCUMENTS

| | | | |
|---|---|---|---|
| 1189846 | 3/1965 | Germany ............................ 378/182 |
| 59-93447 | 5/1984 | Japan ............................ 378/169 |
| 1002792 | 8/1965 | United Kingdom ............................ 378/184 |

*Primary Examiner*—Edward J. Glick
*Attorney, Agent, or Firm*—Panitch, Schwarze Jacobs & Nadel, P.C.

[57] ABSTRACT

An opaque, generally flat flexible cassette is provided which receives and holds a storage phosphor screen while the screen is radiographed. The cassette has sufficient flexibility to be wrapped around an object to be radiographed. The cassette has a light-tight sealing device at or near its open end. The sealing device allows the cassette to be placed in either an open position for receiving or discharging the storage phosphor screen, or a closed position for holding the imaging storage medium therein during radiographing and transport. The cassette is designed so that the storage phosphor screen is discharged from the cassette without being physically handled by a person or being exposed to ambient light.

63 Claims, 7 Drawing Sheets

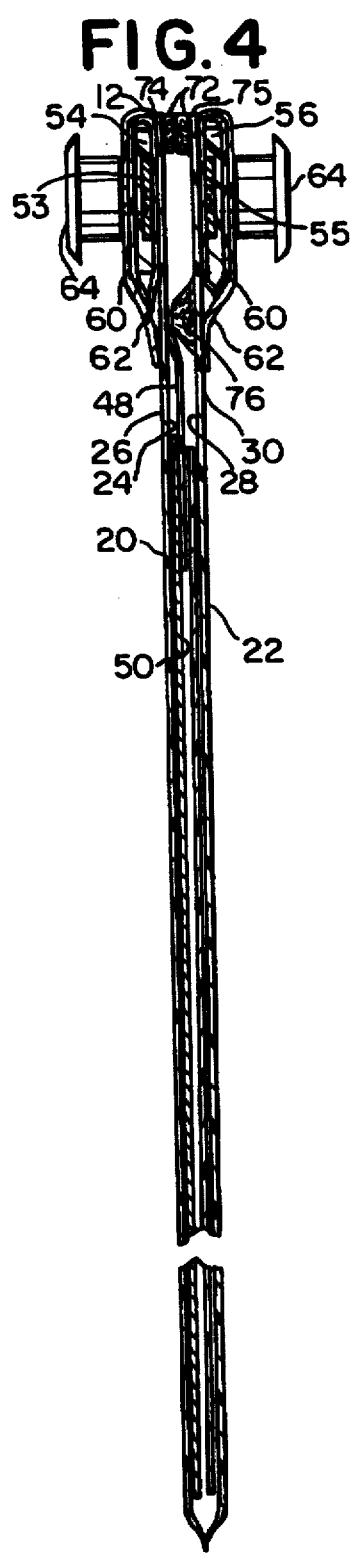
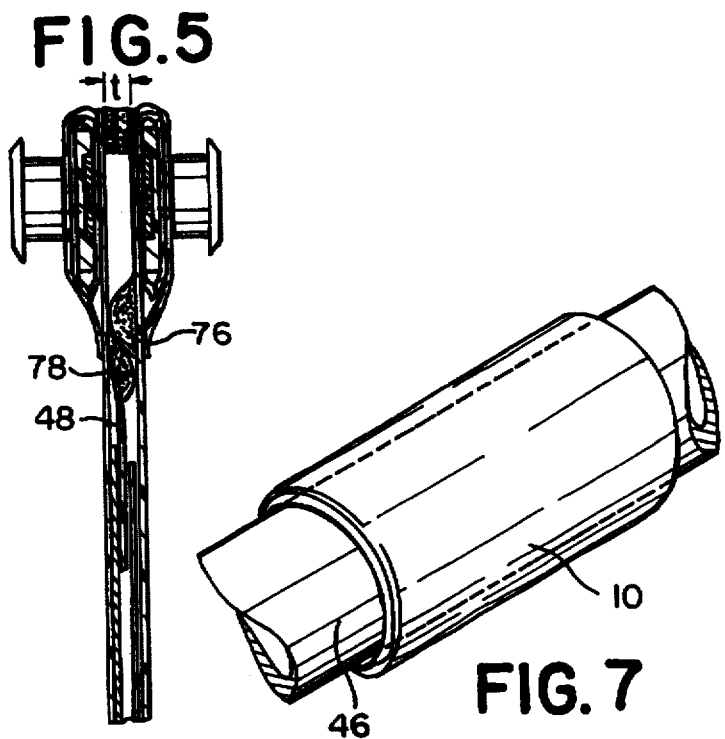
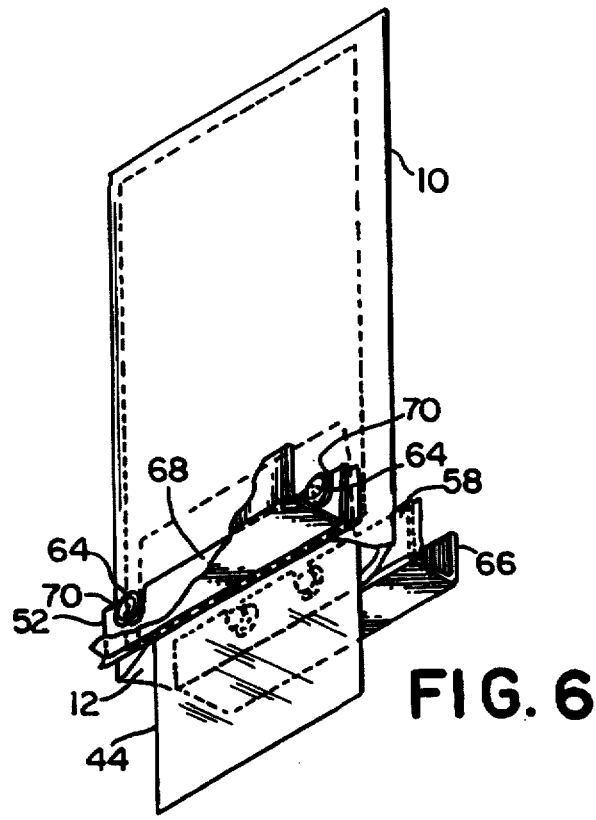

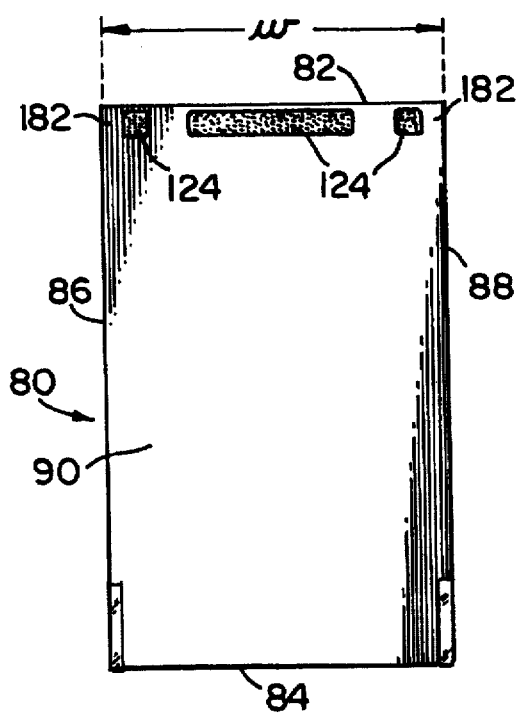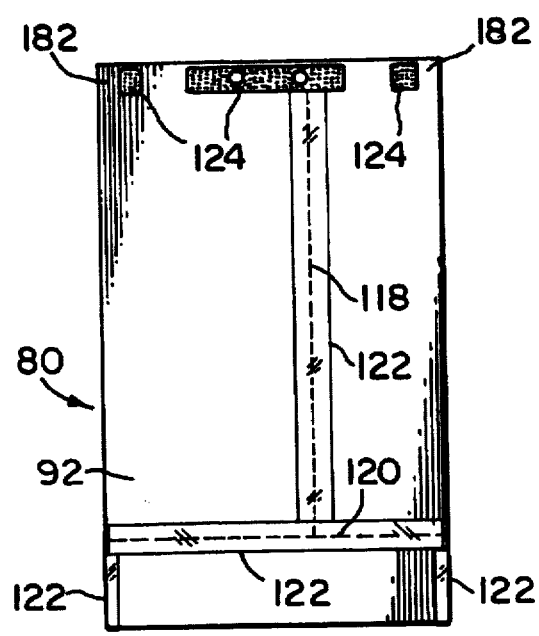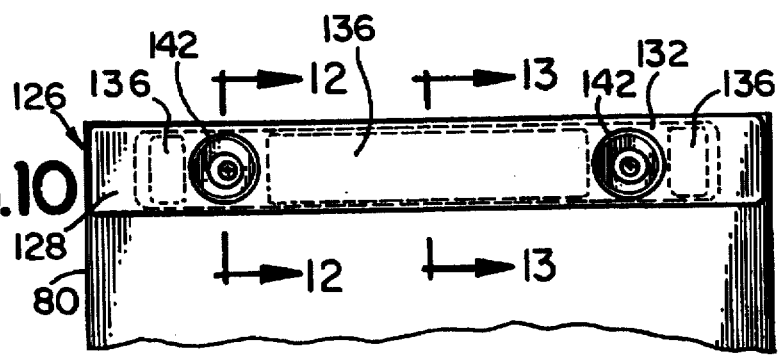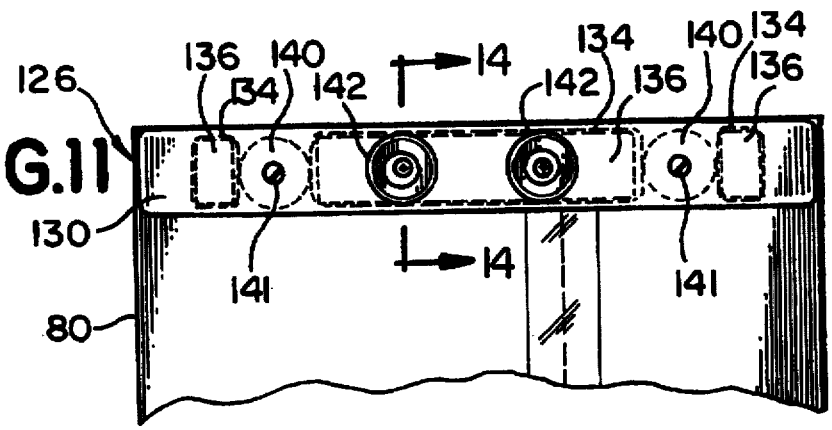

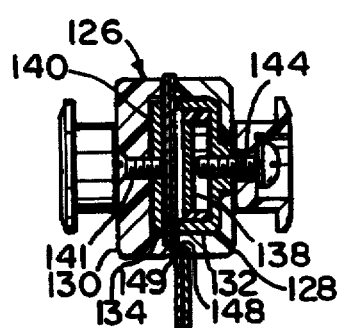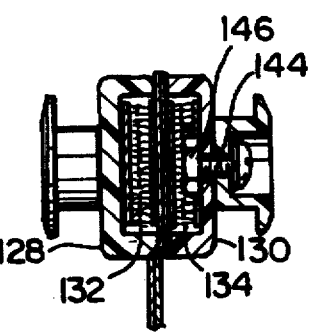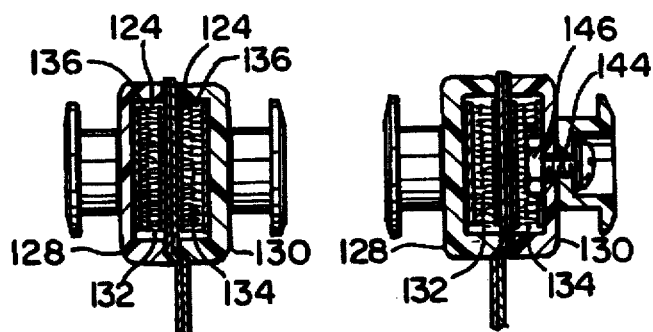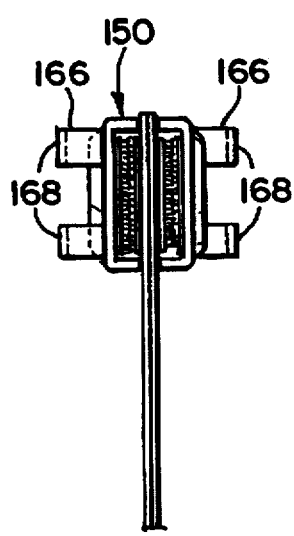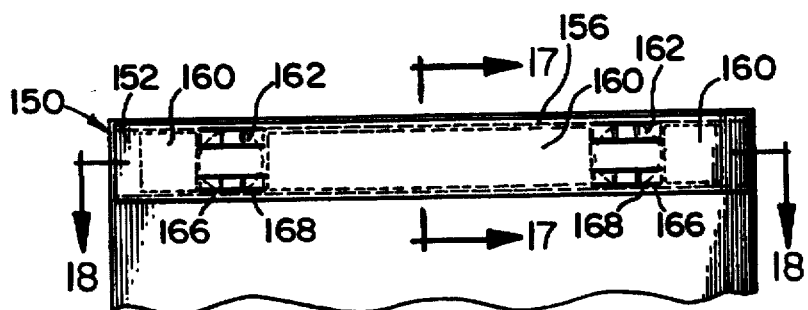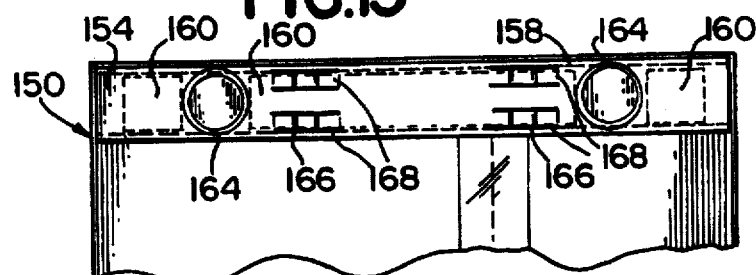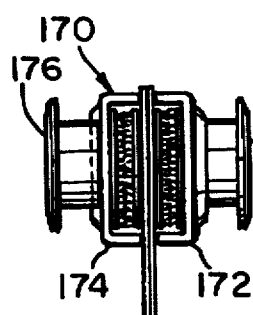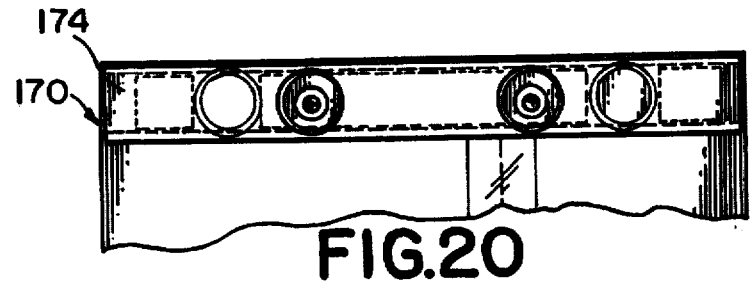

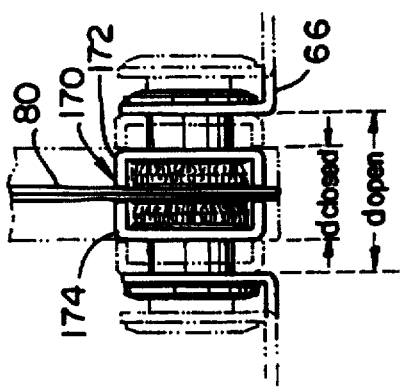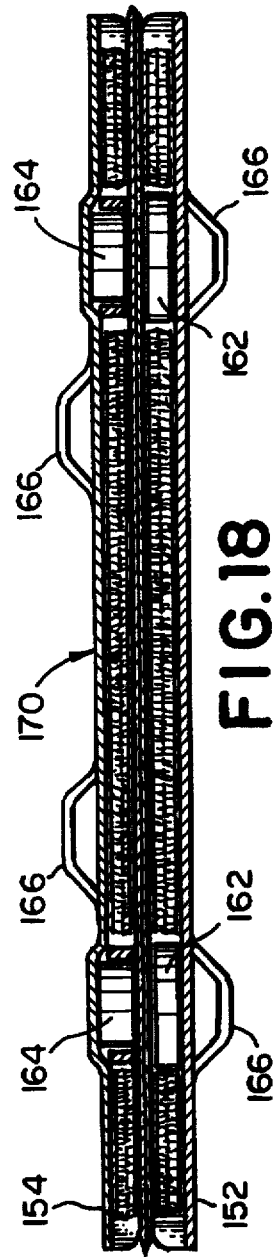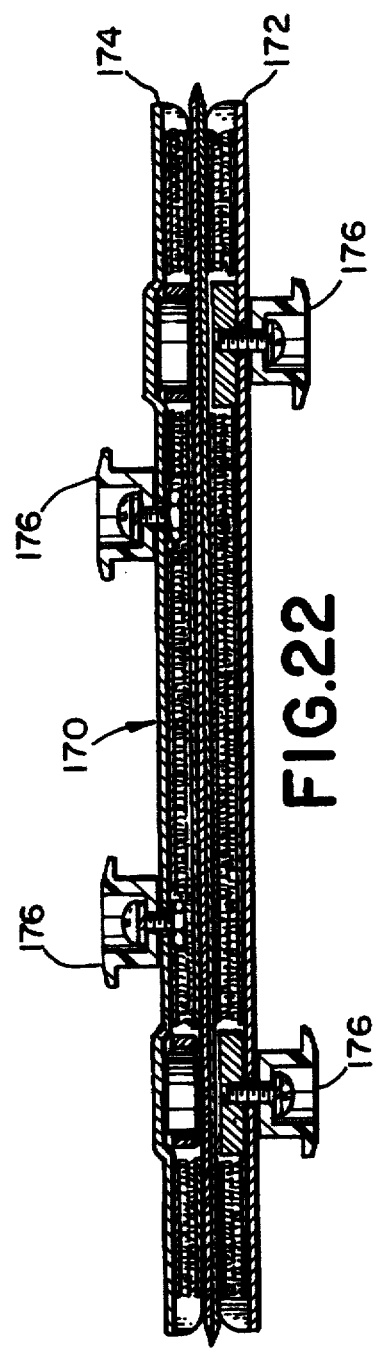

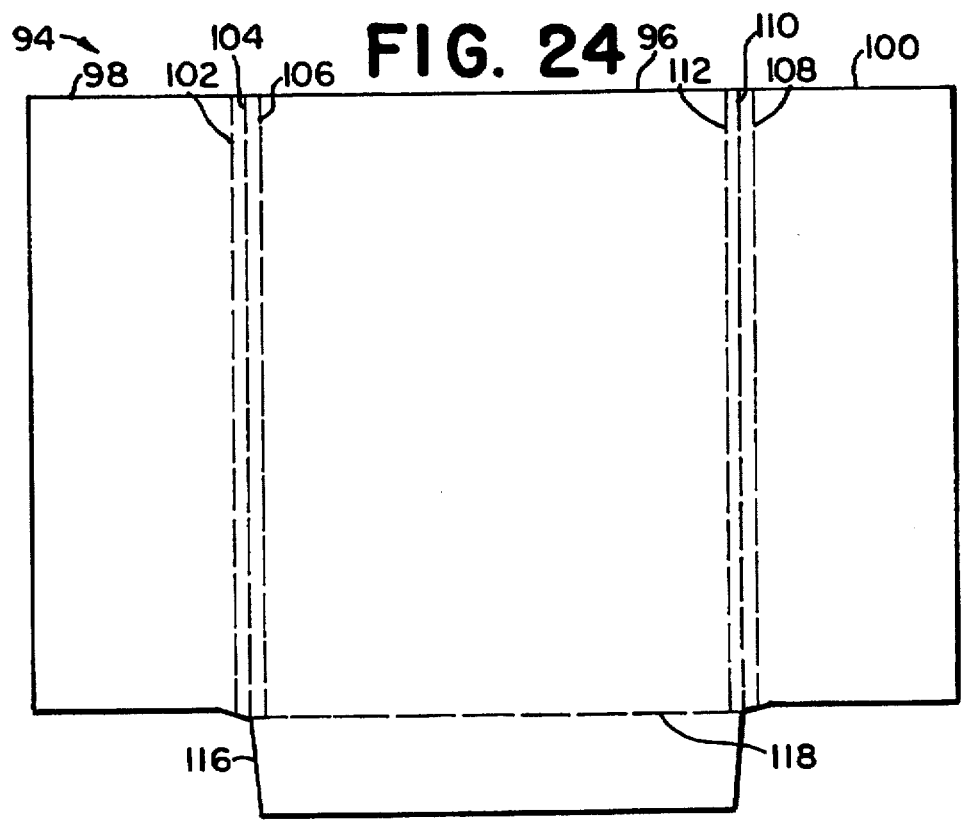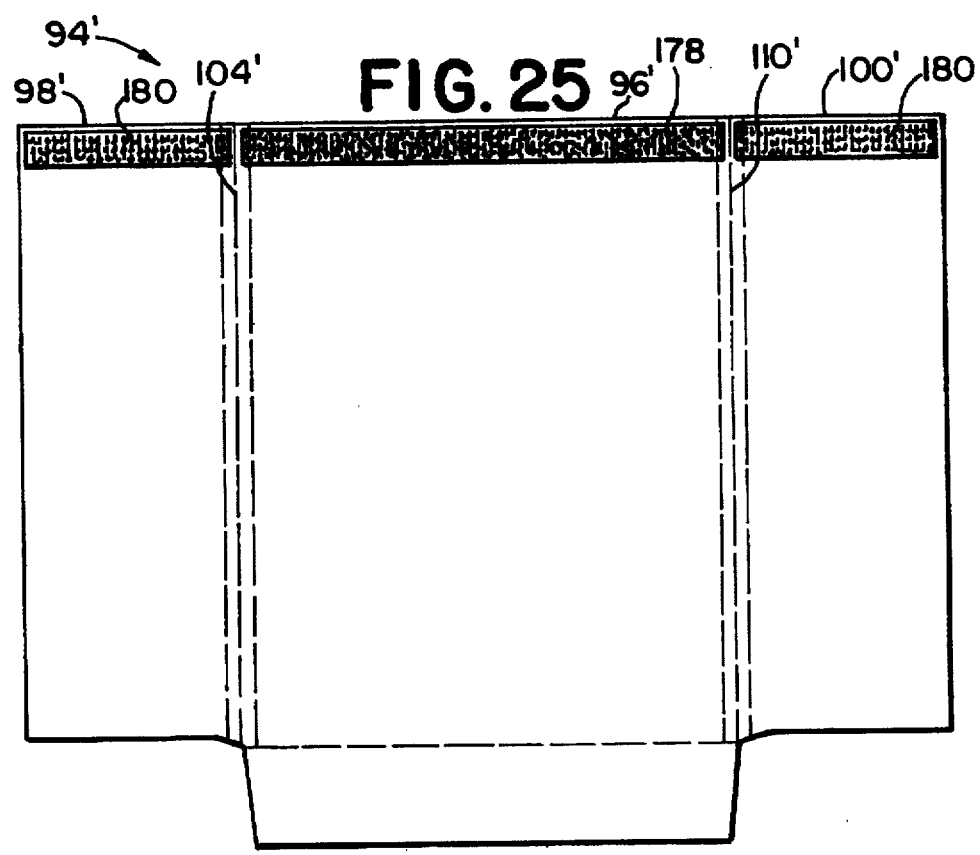

FLEXIBLE CASSETTE FOR HOLDING STORAGE PHOSPHOR SCREEN

FIELD OF THE INVENTION

The present invention relates generally to an opaque, light-tight flexible cassette for holding a storage phosphor screen.

BACKGROUND OF THE INVENTION

An imaging storage medium, such as a storage phosphor screen, is useful for capturing an image of an object. To capture an image, the screen is placed near the object and the object and screen are radiographed by being exposed to electromagnetic radiation, such as x-rays or gamma rays. Then, the phosphor screen undergoes a readout process to obtain the image of the object. The stored latent image in the storage phosphor screen is then erased by adding or removing stored energy and reused.

A typical storage phosphor screen is created by applying a coating of a phosphor layer onto a thin, flexible, rugged substrate, generally formed of a polymeric material. The substrate is generally rectangularly shaped in top plan view and has a thickness in the range of 0.1 mm to 30 mm. The substrate is typically made of acrylic or mylar, although other polymeric materials may be used. The phosphor coating layer may be applied to the substrate using a variety of processes including creating a fine powder of the mixed phosphor elements or components and, thereafter, applying the powder generally evenly over one principal surface of the substrate and securing the powdered phosphor components to the substrate using a suitable binder, adhesive, or the like.

The processes used for creating and, thereafter, "reading" radiographic images using a storage phosphor screen of the type described above are also generally well known in the art. In general, a storage phosphor screen (having negligible stored energy) is positioned adjacent to a product, device, person or item (hereinafter referred to as an "item") for which an image is desired, and the item and the storage phosphor screen are exposed to radiation from a radiation source positioned in such a manner that at least some of the radiation passes through the item before being exposed to the storage phosphor screen. The storage phosphor screen absorbs energy from the received radiation at varying levels and, depending upon the structure, material, and other aspects of the item, a latent image of the item is created on the phosphor screen through a well known process known as "electron trapping". Typically, the storage phosphor screen is first placed in a special cassette or other packaging device which prevents the storage phosphor screen from being exposed to ambient light that could detrimentally affect the latent image of the item stored thereon. An intensifier, comprised of a thin sheet of lead, copper or some other metal, may be positioned between the item and the storage phosphor screen to enhance the quality of the latent image created thereon when high radiation energies are employed.

After creation of the latent image on the storage phosphor screen, the storage phosphor screen is "read" by an optical reader, typically by a laser scanner and digitizer using a photostimulated luminescence process which is generally well known in the art. In the reading process, the entire storage phosphor screen is scanned, in accordance with a predetermined scanning pattern, by an optically focused laser beam, having an appropriate wavelength to stimulate the storage phosphor. The laser scan has the effect of stimulating or releasing trapped electrons. The stimulation and release of the trapped electrons causes visible luminescence to be emitted from the storage phosphor screen in proportion to the energy level stored at specific locations on the storage phosphor screen (i.e., pixels). The intensity of the emitted luminescence for each area or pixel of the storage phosphor screen is electronically measured, utilizing a light sensitive device such as a photomultiplier tube, digitized and stored in a computer memory as a function of the laser position on the storage phosphor screen, thereby creating a gray scale image. Once stored within the computer memory, the digitized data representative of the latent image read from the storage phosphor screen may be recalled and displayed, typically on a high resolution monitor, for analysis or may be printed for later review and analysis, including trend analysis.

The above-described filmless radiography process is generally well known and equipment for performing the process is generally available from manufacturers including Liberty Technologies, Inc., of Conshohocken, Pa.

Storage phosphor screens are sensitive to ambient light, which can erase or distort stored images. Light-tight, generally rigid cassettes for holding a storage phosphor screen are known in the prior art. Such cassettes are useful for holding the screen when imaging an object with x-rays. It is often desirable to image non-planar items or irregular surfaces, such as pipes or the like. Prior art cassettes are typically rigid and thus incapable of accommodating non-planar items or irregular surfaces. The images taken with such cassettes are distorted and not sharp. Some prior art cassettes require physical handling of the storage phosphor screen when transferring the cassettes to an optical reader. Physical handling may overexpose or otherwise damage the storage phosphor screen and may cause fingerprints to appear on it.

It is thus desirable to provide a cassette which is flexible for accommodating non-planar items or irregular surfaces, which secures a storage phosphor screen therein, which provides a light-tight seal during use, which does not significantly attenuate radiation, and which allows the storage phosphor screen to be loaded into and unloaded from an optical reader without physical handling by a person. It is also desirable that such a cassette have a low friction inner surface so that the storage phosphor screen slides easily out of the cassette and into a readout device when the cassette is inverted. The present invention provides such a cassette.

SUMMARY OF THE INVENTION

The present invention is an opaque, generally flat flexible cassette for receiving and holding an imaging storage medium while the storage medium is radiographed. The flexible cassette has a width and an open end extending across at least a portion of the width, a closed end and closed edges, a first inside surface and a second inside surface opposite the first inside surface. The cassette has sufficient flexibility to be wrapped around an object to be radiographed. The flexible cassette includes a substantially light-tight sealing device disposed near the open end. The sealing device allows the cassette to be placed in either an open position for receiving or discharging the imaging storage medium, or a closed position for holding the imaging storage medium therein, between the first and second inside surfaces.

Another embodiment of the invention provides an opaque flexible cassette for receiving and holding an imaging storage medium while the storage medium is radiographed. The flexible cassette has a width and an open end extending across at least a portion of the width, a closed end and closed edges. The cassette comprises a first side, a second side opposite the first side, and a substantially light-tight sealing device. The first and second sides have edges and inner and outer faces. The first and second sides are joined at their edges to form the closed end and closed edges. The light-tight sealing device is disposed near the open end. The sealing device allows the cassette to be placed in either an open position for receiving or discharging the imaging storage medium, or a closed position for holding the cassette therein. In one embodiment of the invention, the sealing device comprises first and second bars held together by magnetic force. Each of the bars extends across at least a portion of the width of the flexible cassette. Each of the bars is permanently or removably attached to opposite an outer facing end surface of the open end of the flexible cassette. Magnetic attraction between the bars causes the opposite end surfaces of the open end of the flexible cassette to be pressed together, thereby closing the open end and inhibiting light from entering therein.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 4 is a sectional view of the cassette in FIG. 1, taken along section line 4—4 of FIG. 1 showing the contents of the cassette and the light sealing structure;

FIG. 5 is a fragmentary upper sectional view of the cassette of FIG. 1 showing the contents of the cassette and a variation in the first embodiment of the light sealing structure;

FIG. 6 is a perspective view of the cassette of FIG. 1 in an open position with its open end facing downward and showing internal structure in phantom and a storage phosphor screen dropping out of the cassette;

FIG. 7 is a schematic diagram which shows the cassette of FIG. 1 wrapped partially around an object to be radiographed;

FIG. 8 is a front plan view of a flexible cassette in accordance with a second preferred embodiment of the present invention;

FIG. 9 is a rear plan view of the flexible cassette of FIG. 8;

FIG. 10 is a partial view of the flexible cassette of FIG. 8, showing a second preferred embodiment of a light sealing structure;

FIG. 11 is a partial view of the flexible cassette of FIG. 9, showing the second preferred embodiment of a light sealing structure;

FIG. 12 is a partial sectional view of the flexible cassette of FIG. 10, taken along section line 12—12 of FIG. 10 showing details of the light sealing structure;

FIG. 13 is a partial sectional view of the flexible cassette of FIG. 10, taken along section line 13—13 of FIG. 10 showing additional details of the light sealing structure;

FIG. 14 is a partial sectional view of the flexible cassette of FIG. 11, taken along section line 14—14 of FIG. 11 showing additional details of the light sealing structure;

FIG. 15 is a partial view of the flexible cassette of FIG. 8 showing a third preferred embodiment of a light sealing structure;

FIG. 16 is a partial view of the flexible cassette of FIG. 8 showing a third preferred embodiment of a light sealing structure;

FIG. 17 is a partial sectional view of the flexible cassette of FIG. 15, taken along section line 17—17 of FIG. 15 showing additional details of the light sealing structure;

FIG. 18 is a partial sectional view of the flexible cassette of FIG. 15, taken along section line 18—18 of FIG. 15 showing additional details of the light sealing structure;

FIG. 19 is a partial view of the flexible cassette of FIG. 8 showing a fourth preferred embodiment of a light sealing structure;

FIG. 20 is a partial view of the flexible cassette of FIG. 8 showing a fourth preferred embodiment of a light sealing structure;

FIG. 21 is a partial sectional view of the flexible cassette of FIG. 19, taken along section line 21—21 of FIG. 19 showing additional details of the light sealing structure;

FIG. 22 is a partial sectional view of the flexible cassette of FIG. 19, taken along section line 22—22 of FIG. 19 showing additional details of the light sealing structure;

FIG. 23 is an end view of the flexible cassette of FIG. 19 showing the light sealing structure in an open and closed position;

FIG. 24 is a plan view of a one-piece blank for forming the flexible cassette of FIGS. 8 and 9;

FIG. 25 is a plan view of a one-piece blank for forming a flexible cassette for use with a fifth preferred embodiment of a light sealing structure.

DETAILED DESCRIPTION OF PREFERRED EMBODIMENT

Figure 1:
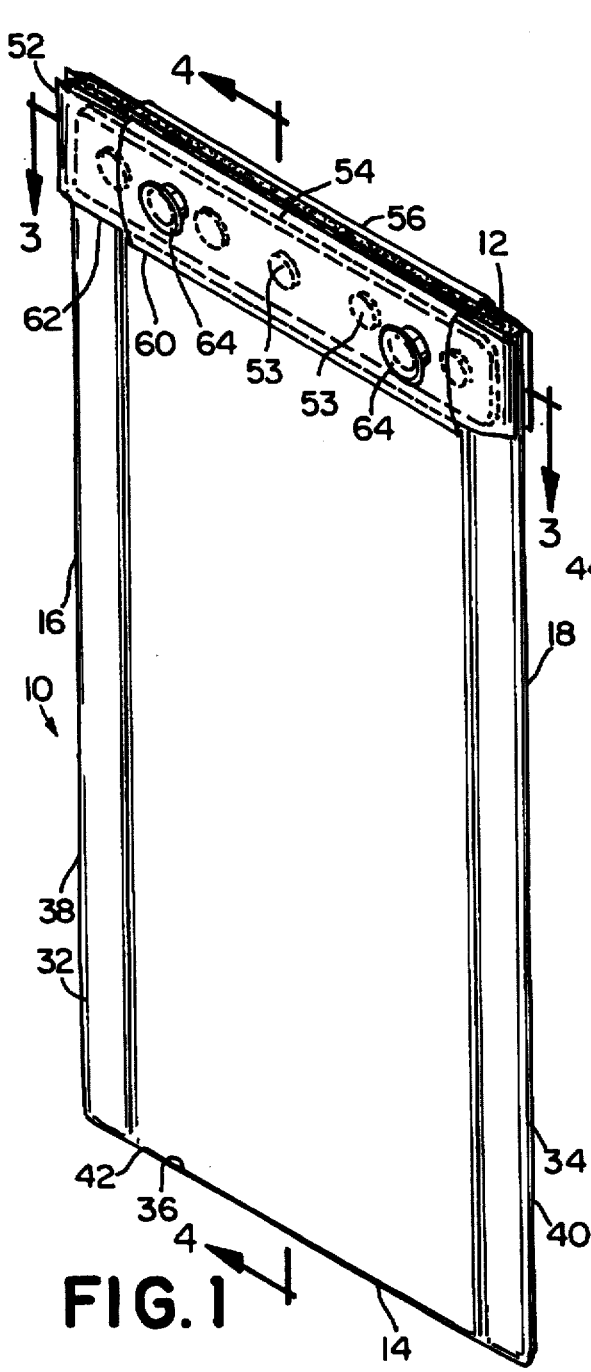
FIG. 1 is a perspective view, partially in phantom, of a flexible cassette and light sealing structure in accordance with a first preferred embodiment of the present invention.

Certain terminology is used herein for convenience only and is not to be taken as a limitation on the present invention. In the drawings, the same reference numerals are employed for designating the same elements throughout the several figures.

Figure 2:
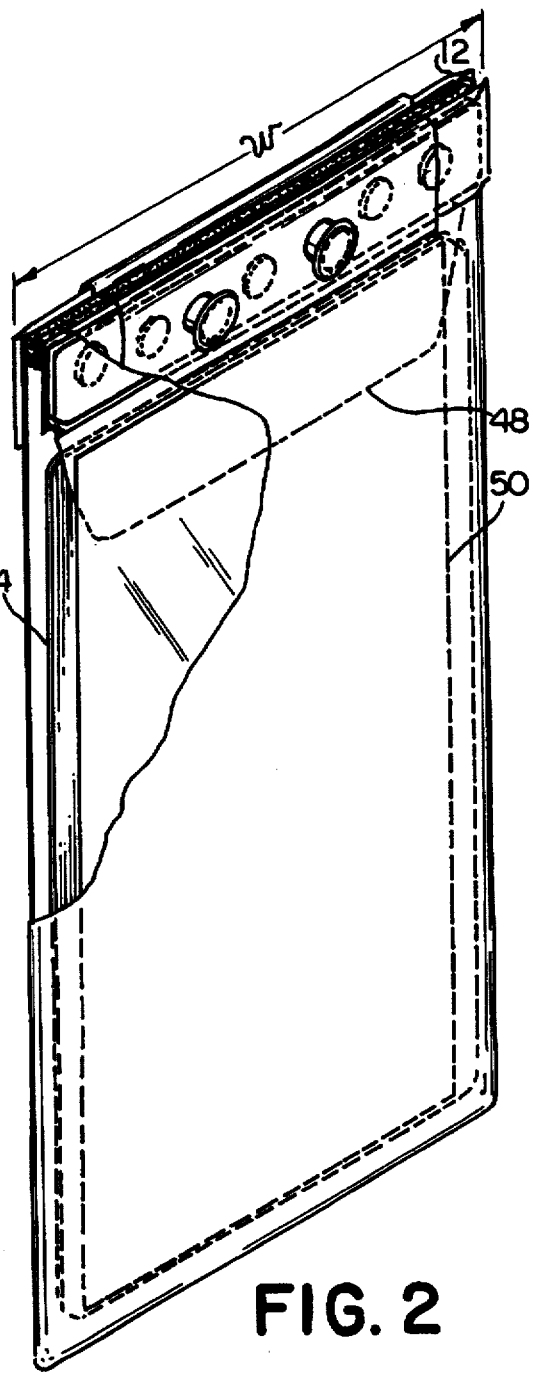
FIG. 2 is a perspective view of the cassette in FIG. 1 with a section broken away to show internal structure, and showing the contents of the cassette in phantom.

FIGS. 1, 2 and 6 show a flexible cassette 10 in accordance with a first preferred embodiment of the present invention. The cassette 10 is in the form of a generally flat, bag-shaped pouch or housing. The cassette 10 is defined by a width, w, an open end 12 extending across at least a portion of the width (best illustrated in FIG. 6), a closed end 14 opposite the open end 12, and closed edges 16, 18. The open end 12 of the illustrated cassette 10 extends across the entire portion of the width.

Referring to FIG. 4, the cassette 10 is defined by a first side 20 and a second side 22 opposite the first side 20. The first side 20 has an inner face or first inside surface 24 and an outer face or first outside surface 26. The second side 22 also has an inner face or first inside surface 28 and an outer face or first outside surface 30. The first inside surfaces 24 and 28 face each other. The first and second sides 20, 22 are constructed of a material which is opaque to visible light and which transmits radiation.

One method of constructing the cassette 10 is by joining the first and second sides 20, 22 at three edges. In this construction method, shown in FIGS. 1 and 2, the first side 20 has two side edges 32, 34, and an end edge 36, and the second side 22 has two side edges 38, 40 and an end edge 42. The first and second sides 20, 22 are joined at the edges 32/38, 34/40 and 36/42 to form, respectively, the closed edges 16 and 18, and the closed end 14. The first and second sides 20, 22 may be formed of separate sheets of material and joined along the edges, as described above. The first and second sides 20, 22 may be formed from a single sheet of material folded over to form the side edges 38 and 40 and sealed anywhere along either surface, and along the end edges 36/42. The first and second sides 20, 22 may also be formed from a single sheet of material folded in half to form the end edges 36/42 and sealed at respective side edges 32/38 and 34/40 to form the closed edges 16 and 18.

FIGS. 2 and 6 show the cassette 10 in a closed and open position, respectively. In the closed position, the cassette 10 is either empty or holds an imaging storage medium such as a storage phosphor screen 44 while it is radiographed. In the open position, the cassette 10 may receive or discharge the storage phosphor screen 44.

Referring to FIG. 7, the cassette 10 has sufficient flexibility to allow it to be wrapped partially or fully around an object 46 to be radiographed, such as a pipe or other curved object or item. To achieve the desired flexibility, the cassette 10 may be constructed entirely or partially of a polymeric material, such as polyvinyl chloride or vinyl coated paper. However, other flexible materials are suitable so long as they are durable enough to form a cassette 10 which can hold the storage phosphor screen 44 and a sheet of flexible intensifying foil (described below) therein without ripping or breaking apart when the cassette 10 is flexed, and sufficiently light-tight and transparent to radiation.

Referring to FIGS. 2 and 4, the cassette 10 preferably carries a flexible sheet of intensifying foil 50 disposed between the phosphor screen 44 and the inside surface 24 of the first side 20. The intensifying foil 50 is preferably secured in the cassette 10 by holding means in the form of adhesive material applied to either the inside surface 24, or to the side of the intensifying foil 50 which faces the inside surface 24. Alternatively, the holding means may be an additional physical structure attached to the cassette 10. Referring to FIGS. 2 and 4, the holding means 48 is shown as a flexible flap attached at one edge to the inside surface 24 near the open end 12 of the cassette 10. The flap 48 extends generally across the entire width of the cassette 10, although it need only extend across a portion of the width. An upper portion of the intensifying foil 50 is thus sandwiched between the flap 48 and the inside surface 24.

One suitable sheet of intensifying foil 50 for use with the invention is a lead foil sheet, such as an 0.005 inch HEXALON™ Radiographic Intensifying Screen, manufactured by Warren Associates, Pittsburgh, Pa. Other types of flexible sheets of intensifying foil 50 may be used instead of a lead foil sheet, as dictated by the radiographic process. While lead is the preferred material for the intensifying foil 50, other metallic foils, such as copper foil, are also suitable.

Referring to FIGS. 1–6, the cassette 10 also has a light sealing structure or sealing device 52 for creating a substantially light-tight seal near or along the open end 12 of the cassette 10. In addition to providing a light-tight seal, the sealing device 52 allows the cassette 10 to be placed in either an open position for receiving or discharging storage phosphor screen (FIG. 6), or a closed position (FIGS. 1–5). In the closed position, the storage phosphor screen 44 is held in the cassette 10 between the intensifying foil 50 if used, and the inside surface 28 of the second side 22.

Figure 3:
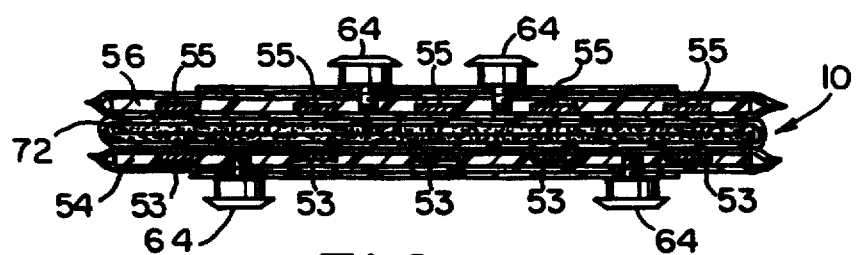
FIG. 3 is a sectional view of the cassette in FIG. 1, taken along section line 3—3 of FIG. 1 showing the contents of the cassette and the light sealing structure.

In a first preferred embodiment of the light sealing structure, best illustrated in FIGS. 1 and 3, the sealing device 52 is constructed of first and second solid bars 54, 56 having pairs of oppositely poled magnets 53, 55 embedded therein. The solid bars 54, 56 extend across the entire width of the cassette 10. One suitable type of magnet for the first and second magnets 53, 55 is a disk magnet, although other types of magnets are within the scope of the invention. One suitable material for the bars 54, 56 is polyvinyl chloride. The magnets 53, 55 are evenly spaced across the entire width of the bars 54, 56. Alternatively, the magnets 53, 55 may extend across a portion of the width if they can provide a magnetic field that extends across the entire width. Maximum light sealing is achieved when the magnets 53, 55 are spaced along the entire width of the cassette 10. As best illustrated in FIG. 4, each of the bars 54, 56 are attached to opposite outer facing end surfaces of the open end 12 of the cassette 10. Thus, the bar 54 is attached to an end surface region of the outside surface 26 of side 22, and the bar 56 is attached to an end surface region of the outside surface 30 of side 20. Magnetic attraction between the first and second pairs of magnets 53, 55 causes the bars 54, 56 to be pressed together, thereby causing the first and second sides 20, 22 near the open end 12 of the cassette 10 to be pressed and held together. This action closes the open end 12, inhibiting light from entering into the cassette 10. The magnetic attraction is sufficiently strong to maintain a tight seal at the open end 12 of the cassette 10, but not so strong as to make it difficult to reopen the cassette 10.

To allow the cassette 10 to fully open to the position shown in FIG. 6, the first and second bars 54, 56 are not secured to the cassette 10 along the entire width. Instead, a small region at the ends of each bar 54, 56 is not secured to the cassette 10. Accordingly, there are four such unattached regions. One region is visible in FIG. 6 and is labeled as 58.

Referring to FIGS. 1, 4 and 5, the first and second bars 54, 56 may be protected by being sealed within a material which allows the magnetic forces to pass therethrough. One suitable material is the same polymeric material of the cassette 10. The first and second bars 54, 56 shown in the figures are completely sealed within material 60. An additional piece of material 62 overlies a center region of each of the bars 54, 56 and attaches to respective first and second sides 20, 22 of the cassette 10 to further secure the bars 54, 56 to the cassette 10. The additional pieces of material 62 may be extensions of the first and second sides 20, 22, folded over and heat sealed at their edges to the respective first and second sides 20, 22. The bars 54 and 56 may be inserted into the folds and secured thereto.

Referring to FIGS. 1–5, the first and second bars 54, 56 each include at least one gripping member 64 for use by a spreader device to open the cassette 10 and for removal of a storage phosphor screen 44, after the storage phosphor screen 44 is radiographed. In the disclosed embodiment, two gripping members 64 are secured to each of the bars 54, 56. The gripping members 64 are secured to the bars 54, 56 by any suitable fastening technique. In one preferred embodiment of the invention disclosed herein, each gripping member 64 is a flanged knob fixed to a respective bar 54 or 56 by complimentary threads.

Referring to FIG. 6, when it is desired to remove the storage phosphor screen 44, the closed cassette 10 is oriented so that the open end 12 faces downward. The cassette 10 is then inserted into a spreader 66. The spreader 66 has two gripping portions 68 with slots 70 for receiving respective gripping members 64 of the cassette 10. (Only the gripping portion 68 of the spreader 66 is shown in FIG. 6.) The two gripping portions 68 separate outwardly through manual or automatic action, forcing the sealing device 52 to unseal. When the sealing device 52 uses magnets, the gripping portions 68 pull apart the magnets 53, 55 in the bars 54, 56, thereby opening the cassette 10. Once open, the storage phosphor screen 44 drops freely out of the cassette 10. It should be recognized that the cassette 10 and the storage phosphor screen 44 are sized so that when the cassette 10 is open and facing downward (as shown in FIG. 6), the storage phosphor screen 44 easily slides out of the cassette 10.

Other types of sealing devices 52 are within the scope of the invention, such as a spring-loaded pull apart mechanism. Also, the sealing device 52 need not be disposed right at the open end 12, but should be disposed near the open end 12.

Referring to FIGS. 3 and 6, the gripping members 64 are arranged along the bars 54, 56 so that the cassette 10 fits into the slots 70 of the spreader 66 in only one orientation. That is, the gripping members 64 and slots 70 line up only when the cassette 10 is inserted with the proper orientation. In the disclosed embodiment, the distance between the gripping members 64 on one side of the cassette 10 is greater than the distance between the gripping members 64 on the other side of the cassette 10. The distances between the slots 70 of the spreader 66 match the gripping member distances. When the storage phosphor screen 44 is unloaded, it drops into a readout device (not shown in FIG. 6), such as an optical scanner. The cassette orientation feature ensures that the storage phosphor screen 44 enters the readout device with the sides facing in the proper direction for readout without human intervention and without exposing the storage phosphor screen 44 to ambient light.

Referring to FIGS. 3–5, the cassette 10 may optionally be provided with a strip of additional light-blocking material 72 at the open end 12. The strip of material 72 is attached to inner edges 74, 75 of the inside surfaces 24, 28, at the open end 12. That is, the strip of material 72 wraps around substantially the entire inner edge of the cassette 10, at the open end 12. The portion of material 72 on inside surface 24 is thus directly opposite the portion of material 72 on inside surface 28. The force of the magnets 53, 55 press together the light-blocking material 72, providing an additional seal to inhibit light from entering the inside of the cassette 10. Suitable light-blocking materials 72 include felt and foam.

Referring again to FIGS. 4 and 5, additional light blocking may optionally be provided by one or more light baffles inside of the cassette 10 and near the open end 12. FIG. 4 shows an embodiment of the invention having one light baffle 76. FIG. 5 shows another embodiment of the invention having two adjacent and partially overlapping light baffles 76 and 78 inside of the cassette 10 and near the open end 12. The light baffles 76 and 78 preferably extend across the entire width of the cassette 10 (not shown), and may be made of felt or some other suitable material.

When the cassette 10 is in the closed position, the interior region near the open end 12 has a thickness, t. In FIGS. 4 and 5, the light baffle 76 extends across the width of the inside surface 28 of the second side 22. The light baffle 76 has a thickness at least equal to the thickness of the interior region near the open end 12. In FIG. 5, the additional light baffle 78 extends across the width of the inside surface 24 of the first side 20 or across the width of the inside surface of the flap 48. The thickness of the light baffle 78 may be less than the thickness of the interior region near the open end 12 because the light baffle 78 merely acts to block any light that may have passed through the far edge of the adjacent and overlapping light baffle 76.

When the cassette 10 is in the open position as shown in FIG. 6, the light baffles 76, 78 are sufficiently spread apart so that they do not interfere with removal of the storage phosphor screen 44. That is, the thickness of the interior region near the open end 12 is significantly larger than the thickness t shown in FIG. 5 so that the storage phosphor screen 44 easily passes by the baffles 76, 78.

It should be recognized that there may be more than one light baffle 76 in the FIG. 4 embodiment, and that there may be more than one set of light baffles 76, 78 in the FIG. 5 embodiment. Whether or not light baffles 76, 78 are used in the cassette 10, the cassette 10 must be substantially impervious or opaque to visible light when it is in the closed position.

FIGS. 8 and 9 show a flexible cassette 80 in accordance with a second preferred embodiment of the present invention. The cassette 80 is in the form of a generally flat, bag-shaped pouch or housing constructed of vinyl coated paper, sometimes referred to as Leatherette or Patchco paper. The cassette 80 allows radiation to transmit therethrough and is substantially impervious or opaque to visible light when it is in the closed position.

The cassette 80 is defined by a width, w, an open end 82 extending across at least a portion of the width (preferably the entire width), a closed end 84 opposite the open end 82, and closed edges 86, 88. The cassette 80 is further defined by a first side 90 (FIG. 8) and a second side 92 (FIG. 9) opposite the first side 90. The first and second sides 90 and 92 each have inside surfaces (not shown) and outside surfaces, just like the cassette 10.

FIG. 24 shows a one-piece blank 94 of vinyl coated paper for constructing the cassette 80 of FIGS. 8 and 9. The blank 94 includes a rectangular center panel 96, flanked on either side by rectangular left and right flaps 98 and 100. There are three closely spaced fold lines 102, 104 and 106 between the left flap 98 and the center region 96. Likewise, there are three closely spaced fold lines 108, 110 and 112 between the right flap 100 and the center region 96. A lower flap 116 extends from a lower edge of the center panel 96. There is also a fold line 118 between the lower flap 116 and the center panel 96. The fold lines 102, 106, 108 and 112 are optional. These fold lines reduce the tendency for a storage phosphor screen 44 to get pinched at the edges or corners of the cassette 80, thereby allowing the phosphor screen to more easily release out of the cassette 80. However, the fold lines 102, 106, 108 and 112 might introduce artifacts to the image on the storage phosphor screen 44.

Referring to FIGS. 8, 9 and 24, the cassette 80 is constructed from the blank 94 as follows. The blank 94 is folded along the fold lines 104, 110 and 118 and the left and right flaps 98 and 100 are brought together and placed over the center panel 96. Since the combined width of the left and right flaps 98 and 100 is greater than the width of the center panel 96, one of the flaps 98 and 100 overlaps the other. In the cassette 80, the left flap 98 overlaps the right flap 100

(see FIG. 9). Next, the lower flap 116 is placed over the left and right flaps 98 and 100. The flaps 98, 100 and 116 are fastened to each other by any suitable fastening means such as adhesive, tape, or the like. The seams made by the flaps 98, 100 and seams made by the flap 116 are preferably closed using a plasticizer resistant transfer adhesive. Other fastening means are within the scope of the invention, such as tape. In FIG. 9, seams 118 and 120 and seams made by the flaps 116 are closed by strips of tape 122. If desired, the inside seam (not shown) formed by the left and right flaps 98 and 100 may also be fastened together so that the inside surface of the cassette 80 is completely smooth.

As noted above, the fold lines 102, 106, 108 and 112 are optional. If these extra fold lines are not formed, the fold lines 104 and 110 may be wrapped around a mandrel during construction of the cassette 80 from a blank 94 to provide a rolled bend to that portion of the blank 94. When the cassette 80 is fully assembled, the side edges of the cassette 80 will have a thickness greater than the stacked thickness of the center panel 96 and left or right flap 98 or 100. Paper-based materials have a memory which will retain the enhanced thickness. The rolled bend provides the same phosphor screen pinch-reducing function as the extra fold lines.

Referring again to FIGS. 8 and 9, the cassette 80 includes pieces of hook or loop fastening strips 124 (e.g., VELCRO®) disposed on the first and second sides 90 and 92, near and along the open end 82. The fastening strips 124 are used to secure a removable light sealing structure to the cassette 80. Since vinyl coated paper and fastening strips are inexpensive, in comparison to a material such as polyvinyl chloride, the cassette 80 may be disposed of after it becomes unserviceable through use. The light sealing structure is removed before disposal of the cassette 80 and may be reused with other cassettes.

FIGS. 10-23 and 25 show second, third, fourth and fifth preferred embodiments of a light sealing structures or sealing devices suitable for use with the cassette 80. Each of the four sealing devices creates a substantially light-tight seal near or along the open end 82 of the cassette 80 and allows the cassette 80 to be placed in either an open position for receiving or discharging a storage phosphor screen, or a closed position as described above.

Generally, each of the three sealing devices shown in FIGS. 10-23 have two parts, a first rigid bar and a second rigid bar. The first and second bars are not physically attached to each other in any manner. Instead, one of the bars includes a plurality of magnets embedded therein which align with magnetically attractive metal pieces on the other bar. The alignment is similar to the magnet scheme of the first embodiment, except that only one bar (i.e., one side) has magnets. Each of the bars also has complementary hook or loop fastening strips for attachment to respective sides of the cassette 80. Each of the bars also includes gripping members, similar to those described in the first embodiment, for allowing a spreader 66 (FIG. 6) to latch onto the bars and pull them apart, thereby opening the cassette 80. In all three alternative embodiments, the complementary hook and loop fastening strips form a stronger attachment between the bars and the cassette 80 than the magnetic attraction between the magnet and the piece of metal of the bars (as attenuated by the intermediary cassette material). Thus, when the spreader 66 pulls the gripping members apart, the magnets pull apart before the fastening strips of a bar separates from the complementary fastening strip 124 of the cassette 80.

Together, the first and second bars perform the same functions as the sealing device 52 of FIGS. 1-6. However, the second, third and fourth embodiments of sealing devices differ from the first embodiment in that the sealing devices of these embodiments may be easily removed from the cassette 80 after use and placed on a new cassette 80. Removal of the bars from the cassette 80 also provides the cassette with greater flexibility to facilitate more widespread use, particularly in radiographing of irregularly shaped objects. However, if the first and second bars are removed, another means of maintaining the light-tight seal must be used before the bars are removed.

FIGS. 10-14 show the second preferred embodiment of a sealing device, FIGS. 15-18 show the third preferred embodiment of a sealing device, and FIGS. 19-22 show the fourth embodiment of a sealing device. Each of the three embodiments are described in detail below.

Referring to FIGS. 10-14, sealing device 126 has a first bar 128 (FIG. 10), and a second bar 130 (FIG. 11). The first and second bars 128 and 130 are each made of a rigid material, such as PLEXIGLAS® (methyl acrylate plastic). Channels 132 and 134 extend across portions of the first and second bars 128 and 130. There is no channel near the opposite ends of the bars 128 and 130. Thus, the first and second bars 128 and 130 are C-shaped in cross-section along certain portions (FIGS. 12-14) and solid in cross-section near the opposite ends (not shown). Fastening strips 136 are disposed in the channels 132 and 134 and are attached thereto, such as by an adhesive backing (FIGS. 10, 11, 13 and 14). If the fastening strips 124 of the cassette 80 are of a hook type, the fastening strips 136 of the bars 128 and 130 are of a loop type, or vice-versa. The channel 132 of the first bar 128 includes a pair of magnets 138. One magnet 138 is shown in FIG. 12. The magnets 138 are not visible in FIG. 10 because they are directly beneath the gripping members (described below). The channel 134 of the second bar 130 includes a pair of magnetically attractive metal or pole pieces 140 aligned with the magnets 138. The metal pieces 140 are firmly secured to the second bar 130 by screws 141. One metal piece 140 and screw 141 is shown in FIG. 12. Both metal pieces 140 are shown in phantom in FIG. 11. The screws are also shown in FIG. 11. If desired, the magnets 138 and metal pieces 140 may be switched so that the magnets 138 are on the second bar 130 and the metal pieces 140 are on the first bar 128. Alternatively, a single magnet and a single metal piece could be secured to each bar 128, 130. Each of the first and second bars 128 and 130 include a pair of gripping members 142. The gripping members 142 are flanged knobs, such as those shown in FIGS. 1-6 with respect to the first embodiment of a light sealing structure. The gripping members 142 are firmly secured to the bars 128 and 130 by screws 144 or by screws 144 and bolts 146. The screws 144 also secure the magnets 138 to the bar 128 (FIG. 12). Thus, the magnets 138 may be replaced by merely removing the screws 144. The first and second bars 128 and 130 may optionally include a complementary groove 148 and lip 149, respectively, along their lower edges to slightly crimp the cassette 80 and enhance the light-tight seal (FIG. 12).

Referring to FIGS. 15-18, a third preferred embodiment of a sealing device 150 has a first bar 152 (FIG. 15), and a second bar 154 (FIG. 16). The first and second bars 152 and 154 are each made of channel-shaped nonmagnetic rigid strips, such as brake formed aluminum. The channels 156 and 158 in the first and second bars 152 and 154 thus extend across their entire lengths. Fastening strips 160 are disposed in the channels 156 and 158 in the same manner as in the second embodiment. The channel 156 of the first bar 152 includes a pair of magnetically attractive metal pieces 162, best shown in FIG. 18. The channel 158 of the second bar 154 includes a pair of magnets 164 aligned with the metal pieces 162. The metal pieces 162 and the magnets 164 are firmly secured to the first and second bars 152 and 154 by any suitable means. Each of the first and second bars 128 and 130 include a pair of gripping members 166. The gripping members 166 extend from the bars 152 and 154 in the same location as the flanged knob gripping members of FIGS. 10–14. Each gripping member 166 comprises a pair of generally U-shaped projecting knockouts 168 pressed out of the bar material. The knockouts 168 are vertically aligned in the views of FIGS. 15 and 16. The knockouts 168 may be formed out of the bars 152 and 154 by a punch machine prior to attachment of the fastening strips 160, metal pieces 162 and magnets 164. The sealing device 150 has less parts than the sealing device 126 and uses less expensive bar material.

A cassette 80 using the sealing device 150 is opened and closed in the same way as the sealing devices 52 and 126. However, the spreader 66 of FIG. 6 is fitted with pins (not shown), instead of slots 70. The pins are positioned to extend through the vertically aligned knockouts 168 before the spreader 66 is expanded to open the cassette 80.

Referring to FIGS. 19–22, a fourth preferred embodiment of a sealing device 170 has a first bar 172 (FIG. 19), and a second bar 174 (FIG. 20). The first and second bars 172 and 174 are identical to the first and second bars 152 and 154 in FIGS. 18–21, and include identical fastening strips, magnets and metal pieces. However, the first and second bars 172 and 174 do not have gripping members with U-shaped knockouts. Instead, the first and second bars 172 and 174 have flanged knob gripping members 176, similar to those described in connection with the second embodiment of FIGS. 10–14, which fit the spreader 66 of FIG. 6.

FIG. 23 shows an end view of a flexible cassette 80 and sealing device 170 in accordance with the fourth embodiment of a light sealing structure as they appear engaged with a spreader 66 of FIG. 6. The closed position of the sealing device 170 is shown in solid lines, and the open position is shown in phantom. FIG. 23 clearly illustrates the positions of the first and second bars 172 and 174 in the closed and open position, and the travel distance from the closed to the open position. In one preferred example of the sealing device 170, the distance between the outer surfaces of the first and second bars 172 and 174 when the cassette 80 is closed ($d_{closed}$) is about 0.53 inches, and the distance between the outer surfaces of the first and second bars 172 and 174 when the cassette 80 is open ($d_{open}$) is about 0.91 inches. Thus, the spreader 66 causes about 0.38 inches of travel in the sealing device 170.

FIG. 25 shows a blank 94' which is identical to the blank 94 of FIG. 24, except for the addition of pieces of hook or loop fastening strips permanently attached to one inside of the blank 94', near and along an end which becomes the open end of an assembled cassette (not shown). One type of fastening strip 178 is attached to the center panel 96', and complementary fastening strips 180 are attached to the left and right flaps 98' and 100'. When the blank 94' is assembled into a cassette, the fastening strips 178 and 180 become disposed on an inside surface of the cassette, near the open end. Together, the fastening strips 178 and 180 form the fifth embodiment of a light sealing structure. The assembled cassette also includes the outside surface fastening strips 124 shown in FIGS. 8 and 9 which attach to complementary fastening strips on first and second bars for use in opening and closing a cassette. Any embodiment of the first and second bars may be used with such a cassette. However, since a cassette formed by the blank 94' has a built-in light seal (fastening strips 178 and 180, when joined together) which can be opened by pulling apart the fastening strips 178 and 180 and closed by pressing the two sides of the cassette together, it is not necessary to magnetically join first and second bars. Thus, the first and second bars are identical to those described above, except that they do not include any magnets or metal pieces. When using a cassette made from the blank 94', it may be necessary to more fully open the cassette when inserting and removing a phosphor sheet than in other cassette embodiments to avoid catching the phosphor sheet on the rough-surfaced fastening strips 178 or 180.

To allow the cassette 80 to fully open to a position similar to that shown in FIG. 6 for cassette 10, the hook or loop fastening strips 124 do not extend along the entire width of the cassette 80. Instead, a small region at the ends of each half of the light sealing structure is not secured to the cassette 80. Accordingly, there are four such unattached regions 182, labeled in FIGS. 8 and 9.

The storage phosphor screen 44 must be loaded into, and unloaded from, the cassette 80 in the proper orientation so that when the cassette 80 is placed in the spreader 66, the exiting screen 44 faces the exposure side of the optical scanner without having to be physically turned over. Specifically, the phosphor side of the screen 44 must face the exposure side. FIG. 8 shows the exposure or phosphor side. To ensure proper orientation, the wider spaced gripping members 142 must be associated with the first side 90, as shown in FIGS. 8 and 10, and the narrower spaced gripping members 142 must be associated with the second side 92, as shown in FIGS. 9 and 11. To prevent the first and second bars of the various embodiments from being put on backwards, the hook and loop fastening strips 124 are arranged as follows:

| | |
|---|---|
| strips on the first side 90 | hook-type |
| strips on the second side 92 | loop-type |
| strips on the first bar | loop-type |
| strips on the second bar | hook-type |

Alternatively, the strips 124 may be arranged in the exact opposite manner. Since similar types of fastening strips do not stick well to each other, it will be immediately apparent to the user if the bars are put on backwards.

The cassette 80 accepts a flexible sheet of intensifying foil 50 (not shown in FIGS. 8–22) in the same manner as the cassette 10. It is also preferred that at least the inside surfaces of cassettes 10 and 80 be constructed of a suitable smooth, non-catching material so that the storage phosphor screen 44 slides easily in and out of the cassettes with substantially zero friction. The cassettes 10 and 80 are also preferably constructed of an anti-static material to inhibit dust and the like from being attracted to thereto. Furthermore, the cassettes 10 and 80 are preferably constructed of a material which is spill resistant, resistant to chemical attack and able to withstand extremes in temperature and humidity. As discussed above, polyvinyl chloride and vinyl coated paper are two suitable materials which have these properties, are durable enough to be repeatedly reused, and are flexible enough to wrap partially or fully around objects. Other materials suitable for fabrication of the cassettes 10, 80 will be apparent to those skilled in the art.

Figure 26A:
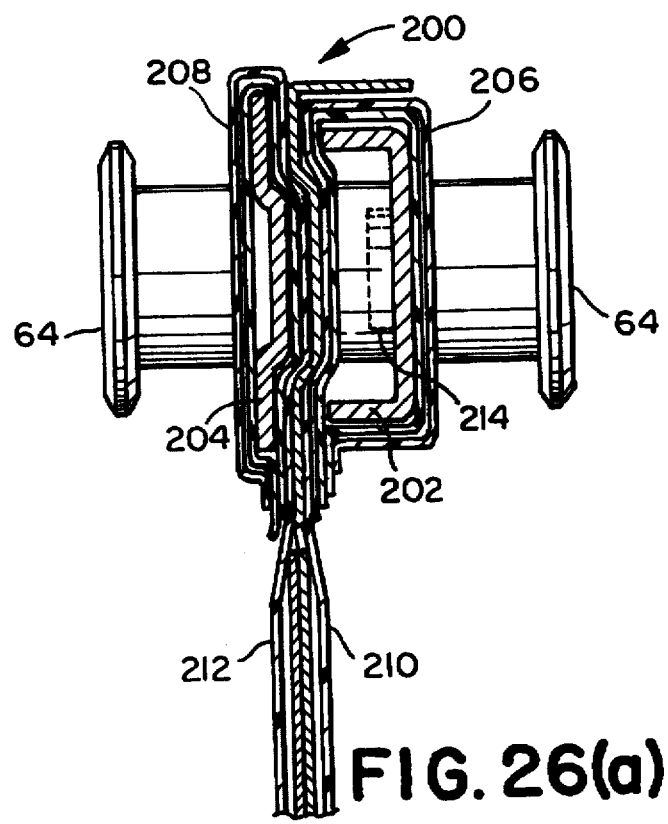
FIGS. 26(a) and 26(b) are fragmentary upper sectional views of a cassette, similar to the cassette of FIG. 1, in a closed and open position, respectively, showing the contents of the cassette and a sixth preferred embodiment of the light sealing structure.
Figure 26B:
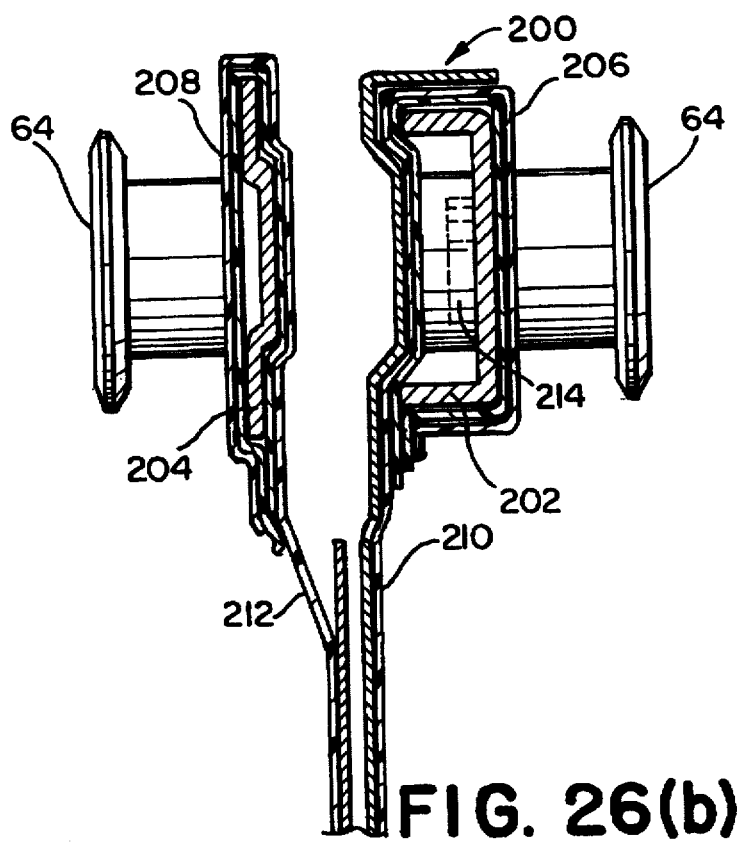

FIGS. 26(a) and 26(b) show fragmentary upper sectional views of a cassette 200 having a sixth preferred embodiment of the light sealing structure in a closed and open position, respectively. The cassette 200 is similar in construction to the cassette 10 of FIG. 1. However, the bars 54 and 56 in the first embodiment of the light sealing structure are replaced by a channel-shaped bar 202 similar to the first or second bars 172 or 174 of the fourth preferred embodiment of a light sealing structure, and a ridge-shaped pole piece 204. One suitable material for the pole piece 204 is stock steel. Like the cassette 10, the bar 202 and pole piece 204 are secured to the cassette 200 by additional pieces of material 206 and 208, respectively, which overlie at least center regions of the bar 202 and pole piece 204, and attach to respective first and second sides 210, 212 of the cassette 200. The additional pieces of material 206 and 208 may be extensions of the first and second sides 210, 212, folded over and heat sealed at their edges to the respective first and second sides 210, 212. The bar 202 and pole piece 204 may be inserted into the folds and secured thereto. The ridges in the pole piece 204 provide a tortuous path for light through the light sealing structure when the cassette 200 is in the closed position, as shown in FIG. 26(a). One pair of magnets 214 is attached to the bar 202 at appropriately spaced locations along the bar 202, against an inside surface of the channel. One such magnet 214 is shown in phantom. The magnets 214 magnetize the entire bar 202 which, in turn, magnetically attracts the pole piece 204, along its entire length. The light sealing structure of the cassette 200 includes gripping members 64 in the same manner as the cassette In addition to the flexible sheet of intensifying foil 50, an optional second flexible sheet of foil (not shown) may be placed either inside of a cassette on the opposite side of the phosphor screen 44 as the intensifying foil 50, or outside of a cassette, against one outer surface. The second foil sheet reduces scatter of radiation during the imaging process.

One suitable type of storage phosphor screen 44 for use with the invention is made of SrS:Ce,Sm, and is manufactured by Liberty Technologies, Inc., Conshohocken, Pa. In this type of phosphor screen, ionizing radiation adds energy to the screen. Other types of phosphor screens are also suitable for use with the invention. The cassettes 10 and 80 are sized to accommodate the desired storage phosphor screen size. Storage phosphor screen sizes that are particularly prevalent in the marketplace are 7×10 inches, 7×17 inches, 8×10 inches, 9½×10 inches and 14×17 inches.

In use, the storage phosphor screen 44 is radiographed by being exposed to electromagnetic radiation, typically x-rays or gamma rays. In the example of FIG. 6, the resultant image on the storage phosphor screen 44 provides information regarding the condition of the object 46 which can be extracted by a readout device. The flexible cassettes 10 and 80 may also be used with other types of imaging storage media, such as film.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An opaque, generally flat flexible cassette for receiving and holding an imaging storage medium while the storage medium is radiographed, the flexible cassette having a width and an open end extending across at least a portion of the width, a closed end and closed edges, a first inside surface and a second inside surface opposite the first inside surface, the cassette having sufficient flexibility to be wrapped around an object to be radiographed, the flexible cassette comprising a substantially light-tight sealing device disposed near the open end, the sealing device allowing the cassette to be placed in either an open position for receiving or discharging the imaging storage medium, or a closed position for holding the imaging storage medium therein, between the first and second inside surfaces, wherein the sealing device comprises first and second bars having pairs of oppositely poled magnets embedded therein and spaced along the bars, each bar extending across at least a portion of the width of the cassette, and attached to opposite outer facing end surfaces of the open end of the flexible cassette, magnetic attraction between the pairs of magnets causing the opposite end surfaces of the open end of the flexible cassette to be pressed together, thereby closing the open end of the cassette and inhibiting light from entering inside the flexible cassette.

2. A flexible cassette according to claim 1 wherein the open end has an inner edge, the flexible cassette further comprises a light-blocking material attached along substantially the entire inner edge, the light-blocking material providing a seal to inhibit light from entering inside of the flexible cassette.

3. A flexible cassette according to claim 2 wherein the light-blocking material is felt or foam.

4. A flexible cassette according to claim 1 wherein the first and second bars each include at least one gripping member for allowing a spreader to pull apart the pairs of magnets and thereby place the cassette in the open position, wherein the flexible cassette and imaging storage medium are sized so that when the flexible cassette is positioned with the open end facing downward and in the open position, the imaging storage medium slides out of the flexible cassette.

5. A flexible cassette according to claim 4 wherein the gripping member is a flanged knob fixed to the respective bar.

6. An opaque, generally flat flexible cassette for receiving and holding an imaging storage medium while the storage medium is radiographed, the flexible cassette having a width and an open end extending across at least a portion of the width, a closed end and closed edges, a first inside surface and a second inside surface opposite the first inside surface, the cassette having sufficient flexibility to be wrapped around an object to be radiographed, the flexible cassette comprising a substantially light-tight sealing device disposed near the open end, the sealing device allowing the cassette to be placed in either an open position for receiving or discharging the imaging storage medium, or a closed position for holding the imaging storage medium therein, between the first and second inside surfaces, wherein the cassette has a first outside surface and a second outside surface, the sealing device comprising a first and a second bar removably attachable to the first and second outside surfaces, respectively, near and along the open end, the first bar having at least one magnet spaced along its length, the second bar having at least one magnetically attractive metal piece spaced along its length and aligned with the magnet, magnetic attraction between the magnet and the metal piece causing the first and second outside surfaces near the open end to be pressed together, thereby closing the open end and inhibiting light from entering inside the cassette.

7. A flexible cassette according to claim 6 wherein the first and second bars each include at least one gripping member for allowing a spreader to pull apart the magnet from the metal piece and thereby place the cassette in the open position, wherein the flexible cassette and imaging storage medium are sized so that when the flexible cassette is positioned with the open end facing downward and in the open position, the imaging storage medium slides out of the flexible cassette.

8. A flexible cassette according to claim 7 wherein the gripping member is a flanged knob fixed to the respective bar.

9. A flexible cassette according to claim 7 wherein the gripping member is a generally U-shaped knockout for receiving a pin.

10. A flexible cassette according to claim 6 wherein the first and second bars are made of a rigid material.

11. A flexible cassette according to claim 10 wherein the first and second bars are made of plastic.

12. A flexible cassette according to claim 6 wherein the first and second bars are made of channel-shaped pieces of nonmagnetic material.

13. A flexible cassette according to claim 12 wherein the first and second bars are made of aluminum.

14. A flexible cassette according to claim 6 wherein the cassette further including hook or loop fastening material disposed on the first and second outside surfaces, near and along the open end, the first and second bars further including complementary hook or loop fastening material for mating with the cassette fastening material, thereby removably securing the first and second bars to the cassette.

15. A flexible cassette according to claim 14 wherein the first outside surface is an exposure side, and the second outside surface is a non-exposure side, and the first and second bars each include at least one gripping member for use in inserting the flexible cassette into a spreader, the at least one gripping member of the first bar being arranged differently from the at least one gripping member of the second bar so that the flexible cassette must be inserted into the spreader in a predetermined orientation with respect to the exposure side, the hook and loop fastening material of the exposure and non-exposure sides and the complementary hook and loop fastening material of the first and second bars being selected so that the gripping members become arranged in the predetermined orientation when the first and second bars are attached to the flexible cassette.

16. A flexible cassette according to claim 6 further comprising an intensifying foil disposed between the first and second inside surfaces, the imaging storage medium being held in the cassette between either the first or second inside surface and the intensifying foil.

17. A flexible cassette according to claim 16 further comprising a flexible sheet of foil disposed between the first and second inside surfaces on an opposite side of the imaging storage medium as the intensifying foil.

18. A flexible cassette according to claim 16 wherein the cassette further comprising a flexible sheet of foil disposed against either the first or second outside surface.

19. A flexible cassette according to claim 6 wherein the inside of the cassette has a first thickness near the open end when the cassette is in the closed position, the cassette further comprising a light baffle extending across at least a portion of the width of the first inside surface near the open end, the light baffle having a thickness at least equal to the first thickness of the cassette.

20. A flexible cassette according to claim 19 wherein the light baffle is felt.

21. A flexible cassette according to claim 6 wherein the cassette is made of a polymeric material.

22. A flexible cassette according to claim 21 wherein the polymeric material is polyvinyl chloride.

23. A flexible cassette according to claim 6 wherein the cassette is made of vinyl coated paper.

24. A flexible cassette according to claim 23 wherein the cassette is a pouch.

25. A flexible cassette according to claim 6 wherein the sealing device is disposed along the open end.

26. A flexible cassette according to claim 6 wherein the open end has an inner edge, the flexible cassette further comprises a light-blocking material attached along substantially the entire inner edge, the light-blocking material providing a seal to inhibit light from entering inside of the flexible cassette.

27. A flexible cassette according to claim 26 wherein the light-blocking material is felt or foam.

28. A flexible cassette according to claim 6 wherein the first and second bars include a complementary groove and lip, respectively, along their lower edges, wherein the groove and lip crimp the flexible cassette when the cassette is in the closed position, the groove and lip thereby further inhibiting light from entering into the cassette.

29. A flexible cassette according to claim 6 wherein the second bar includes one or more ridges, the flexible cassette bending at the one or more ridges when the flexible cassette is in the closed position, the ridges thereby providing a tortuous path for light through the sealing device.

30. An opaque, generally flat flexible cassette for receiving and holding an imaging storage medium while the storage medium is radiographed, the flexible cassette having a width and an open end extending across at least a portion of the width, a closed end and closed edges, a first inside surface and a second inside surface opposite the first inside surface, the cassette having sufficient flexibility to be wrapped around an object to be radiographed, the flexible cassette comprising a substantially light-tight sealing device disposed near the open end, the sealing device allowing the cassette to be placed in either an open position for receiving or discharging the imaging storage medium, or a closed position for holding the imaging storage medium therein, between the first and second inside surfaces, wherein the cassette has a first outside surface and a second outside surface, the flexible cassette further comprising hook or loop fastening material permanently attached to the first and second outside surfaces near the open end for accepting bars with gripping members which open and close the cassette, the sealing device comprising hook or loop fastening material permanently attached to the first inside surface near the open end, and complementary hook or loop fastening material permanently attached to the second inside surface near the open end.

31. An opaque flexible cassette for receiving and holding an imaging storage medium while the storage medium is radiographed, the flexible cassette having a width and an open end extending across at least a portion of the width, a closed end and closed edges, the cassette comprising:

(a) a first side having edges and inner and outer faces;

(b) a second side opposite the first side, the second side having edges and inner and outer faces, the first and second sides being joined at their edges to form the closed end and closed edges; and (c) a substantially light-tight sealing device disposed near the open end, the sealing device allowing the cassette to be placed in either an open position for receiving or discharging the imaging storage medium or a closed position for holding the imaging storage medium therein, wherein the sealing device comprises first and second bars having pairs of oppositely poled magnets embedded therein and spaced along the bars, each bar extending across at least a portion of the width of the cassette, and attached to opposite outer facing end surfaces of the open end of the flexible cassette, magnetic attraction between the first and second magnets causing the first and second sides near the open end to be pressed together, thereby closing the open end of the cassette and inhibiting light from entering inside the flexible cassette.

32. A flexible cassette according to claim 31 wherein the open end has an inner edge, the flexible cassette further comprises a light-blocking material attached along substantially the entire inner edge, the light-blocking material providing a seal to inhibit light from entering inside of the flexible cassette.

33. A flexible cassette according to claim 32 wherein the light-blocking material is felt or foam.

34. A flexible cassette according to claim 31 wherein the first and second bars each include at least one gripping member for allowing a spreader to pull apart the first and second bars and thereby place the cassette in the open position, wherein the flexible cassette and imaging storage medium are sized so that when the flexible cassette is positioned with the open end facing downward and in the open position, the image storage medium slides out of the flexible cassette.

35. A flexible cassette according to claim 34 wherein the gripping member is a flanged knob fixed to the respective bar.

36. An opaque flexible cassette for receiving and holding an imaging storage medium while the storage medium is radiographed, the flexible cassette having a width and an open end extending across at least a portion of the width, a closed end and closed edges, the cassette comprising:
    (a) a first side having edges and inner and outer faces;
    (b) a second side opposite the first side, the second side having edges and inner and outer faces, the first and second sides being joined at their edges to form the closed end and closed edges; and
    (c) a substantially light-tight sealing device disposed near the open end, the sealing device allowing the cassette to be placed in either an open position for receiving or discharging the imaging storage medium or a closed position for holding the imaging storage medium therein,
    wherein the sealing device comprises a first and a second bar removably attachable to the first and second outer faces, respectively, near and along the open end, the first bar having at least one magnet spaced along its length, the second bar having at least one magnetically attractive metal piece spaced along its length and aligned with the magnet, magnetic attraction between the magnet and the metal piece causing the first and second sides near the open end to be pressed together, thereby closing the open end of the cassette and inhibiting light from entering inside the flexible cassette.

37. A flexible cassette according to claim 36 wherein the first and second bars each include at least one gripping member for allowing a spreader to pull apart the magnet from the metal piece and thereby place the cassette in the open position, wherein the flexible cassette and imaging Storage medium are sized so that when the flexible cassette is positioned with the open end facing downward and in the open position, the imaging storage medium slides out of the flexible cassette.

38. A flexible cassette according to claim 37 wherein the gripping member is a flanged knob fixed to the respective bar.

39. A flexible cassette according to claim 37 wherein the gripping member is a generally U-shaped knockout for receiving a pin.

40. A flexible cassette according to claim 36 wherein the first and second bars are made of a rigid material.

41. A flexible cassette according to claim 40 wherein the first and second bars are made of plastic.

42. A flexible cassette according to claim 36 wherein the first and second bars are made of channel-shaped pieces of nonmagnetic rigid material.

43. A flexible cassette according to claim 42 wherein the first and second bars are made of aluminum.

44. A flexible cassette according to claim 36 wherein the cassette further including hook or loop fastening material disposed on the first and second outer faces, near and along the open end, the first and second bars further including complementary hook or loop fastening material for mating with the cassette fastening material, thereby removably securing the first and second bars to the cassette.

45. A flexible cassette according to claim 44 wherein the first outer face is an exposure side, and the second outer face is a non-exposure side, and the first and second bars each include at least one gripping member for use in inserting the flexible cassette into a spreader, the at least one gripping member of the first bar being arranged differently from the at least one gripping member of the second bar so that the flexible cassette must be inserted into the spreader in a predetermined orientation with respect to the exposure side, the hook and loop fastening material of the exposure and non-exposure sides and the complementary hook and loop fastening material of the first and second bars being selected so that the gripping members become arranged in the predetermined orientation when the first and second bars are attached to the flexible cassette.

46. A flexible cassette according to claim 36 further comprising:
    (d) an intensifying foil disposed between the inner faces of the first and second sides, the imaging storage medium being held in the cassette between the inner face of either the first or second side and the intensifying foil.

47. A flexible cassette according to claim 46 further comprising:
    (e) a flexible sheet of foil disposed between the inner faces of the first and second sides on an opposite side of the imaging storage medium as the intensifying foil.

48. A flexible cassette according to claim 46 further comprising:
    (e) a flexible sheet of foil disposed against the outer face of either the first side or second side.

49. A flexible cassette according to claim 36 wherein the inside of the cassette has a first thickness near the open end when the cassette is in the closed position, the cassette further comprising:
    (d) a light baffle extending across at least a portion of the width of the inner. face of the first side near the open end, the light baffle having a thickness at least equal to the first thickness of the cassette.

50. A flexible cassette according to claim 49 wherein the light baffle is felt.

51. A flexible cassette according to claim 36 wherein the cassette is made of a polymeric material.

52. A flexible cassette according to claim 51 wherein the polymeric material is polyvinyl chloride.

53. A flexible cassette according to claim 36 wherein the cassette is made of vinyl coated paper.

54. A flexible cassette according to claim 36 wherein the sealing device is disposed along the open end.

55. A flexible cassette according to claim 36 wherein the open end has an inner edge, the flexible cassette further comprises a light-blocking material attached along substantially the entire inner edge, the light-blocking material providing a seal to inhibit light from entering inside of the flexible cassette.

56. A flexible cassette according to claim 55 wherein the light-blocking material is felt or foam.

57. A flexible cassette according to claim 36 wherein the first and second bars include a complementary groove and lip, respectively, along their lower edges, wherein the groove and lip crimp the flexible cassette when the flexible cassette is in the closed position, the groove and lip thereby further inhibiting light from entering into the flexible cassette.

58. A flexible cassette according to claim 36 wherein the second bar includes one or more ridges, the flexible cassette bending at the one or more ridges when the flexible cassette is in the closed position, the ridges thereby providing a tortuous path for light through the sealing device.

59. An opaque flexible cassette for receiving and holding an imaging storage medium while the storage medium is radiographed, the flexible cassette having a width and an open end extending across at least a portion of the width, a closed end and closed edges, the cassette comprising:

(a) a first side having edges and inner and outer faces;

(b) a second side opposite the first side, the second side having edges and inner and outer faces, the first and second sides being joined at their edges to form the closed end and closed edges; and (c) a substantially light-tight sealing device disposed near the open end, the sealing device allowing the cassette to be placed in either an open position for receiving or discharging the imaging storage medium, or a closed position for holding the imaging storage medium therein, wherein the flexible cassette further comprises hook or loop fastening material permanently attached to the first and second outer faces near the open end for accepting bars with gripping members which open and close the cassette, the sealing device comprising hook or loop fastening material permanently attached to the inner face of the first side near the open end, and complementary hook or loop fastening material permanently attached to the inner face of the second side near the open end.

60. An opaque, generally flat flexible cassette for receiving and holding an imaging storage medium while the storage medium is radiographed, the flexible cassette having a width and an open end extending across at least a portion of the width, a closed end and closed edges, a first inside surface and a second inside surface opposite the first inside surface, the cassette having sufficient flexibility to be wrapped around an object to be radiographed, the flexible cassette comprising a substantially light-tight sealing device disposed near the open end, the sealing device allowing the cassette to be placed in either an open position for receiving or discharging the imaging storage medium, or a closed position for holding the imaging storage medium therein, between the first and second inside surfaces, wherein the cassette has a first outside surface and a second outside surface, the sealing device comprising a first and a second bar attached to the first and second outside surfaces, respectively, near and along the open end, the first bar having at least one magnet spaced along its length, the second bar being a pole piece which is magnetically attractive along its entire length, magnetic attraction between the magnet and the pole piece causing the first and second outside surfaces near the open end to be pressed together, thereby closing the open end and inhibiting light from entering inside the cassette.

61. A flexible cassette according to claim 60 wherein the pole piece is steel.

62. An opaque flexible cassette for receiving and holding an imaging storage medium while the storage medium is radiographed, the flexible cassette having a width and an open end extending across at least a portion of the width, a closed end and closed edges, the cassette comprising:

(a) a first side having edges and inner and outer faces;

(b) a second side opposite the first side, the second side having edges and inner and outer faces, the first and second sides being joined at their edges to form the closed end and closed edges; and (c) a substantially light-tight sealing device disposed near the open end, the sealing device allowing the cassette to be placed in either an open position for receiving or discharging the imaging storage medium or a closed position for holding the cassette therein, wherein the sealing device comprises a first and a second bar attached to the first and second outer faces, respectively, near and along the open end, the first bar having at least one magnet spaced along its length, the second bar being a pole piece which is magnetically attractive along its entire length, magnetic attraction between the magnet and the pole piece causing the first and second sides near the open end to be pressed together, thereby closing the open end of the cassette and inhibiting light from entering inside the flexible cassette.

63. A flexible cassette according to claim 62 wherein the pole piece is steel.

* * * * *